(12) United States Patent
Fukunaka

(10) Patent No.: US 9,668,013 B2
(45) Date of Patent: May 30, 2017

(54) DISPLAY DEVICE

(71) Applicant: Funai Electric Co., Ltd., Daito, Osaka (JP)

(72) Inventor: Kenichi Fukunaka, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 37 days.

(21) Appl. No.: 14/618,422

(22) Filed: Feb. 10, 2015

(65) Prior Publication Data

US 2015/0237392 A1 Aug. 20, 2015

(30) Foreign Application Priority Data

Feb. 14, 2014 (JP) ................................. 2014-026590

(51) Int. Cl.
| | |
|---|---|
| *H04N 21/482* | (2011.01) |
| *H04N 21/431* | (2011.01) |
| *H04N 5/445* | (2011.01) |
| *H04N 21/858* | (2011.01) |
| *H04N 21/442* | (2011.01) |
| *H04N 21/45* | (2011.01) |

(52) U.S. Cl.
CPC ..... *H04N 21/4316* (2013.01); *H04N 5/44543* (2013.01); *H04N 5/44591* (2013.01); *H04N 21/44222* (2013.01); *H04N 21/4532* (2013.01); *H04N 21/4821* (2013.01); *H04N 21/4825* (2013.01); *H04N 21/4826* (2013.01); *H04N 21/858* (2013.01); *H04N 2005/44556* (2013.01)

(58) Field of Classification Search
CPC .......... H04N 2005/44547; H04N 2005/44556; H04N 2005/44565; H04N 21/482; H04N 21/4821; H04N 5/44543
See application file for complete search history.

(56) References Cited

U.S. PATENT DOCUMENTS

| | | | |
|---|---|---|---|
| 2002/0047894 A1* | 4/2002 | Steading | H04N 5/44543 348/44 |
| 2004/0148629 A1 | 7/2004 | Shibamiya et al. | |

(Continued)

FOREIGN PATENT DOCUMENTS

| | | |
|---|---|---|
| EP | 2456196 A1 | 5/2012 |
| JP | 09-182035 A | 7/1997 |

(Continued)

OTHER PUBLICATIONS

Extended European Search Report of the corresponding European Application No. 15154890.6, dated Apr. 7, 2015.

*Primary Examiner* — Nasser Goodarzi
*Assistant Examiner* — Adil Ocak
(74) *Attorney, Agent, or Firm* — Global IP Counselors, LLP

(57) ABSTRACT

A display device includes a display portion, an input portion that receives an instruction to select a program in a program list such that the display portion displays the program with a distinguishable expression, and a controller that links a first program having a program duration shorter than a predetermined threshold with at least one second program arranged relative to the first program along a time axis of the program list as a linked program, and that controls the display portion to display the linked program with the distinguishable expression.

20 Claims, 16 Drawing Sheets

(56) References Cited

U.S. PATENT DOCUMENTS

| | | | |
|---|---|---|---|
| 2005/0286874 A1* | 12/2005 | Hosojima | 386/124 |
| 2006/0263040 A1* | 11/2006 | Mears | G11B 27/031 |
| | | | 386/297 |
| 2010/0205633 A1* | 8/2010 | Kataoka et al. | 725/39 |

FOREIGN PATENT DOCUMENTS

| | | |
|---|---|---|
| JP | 10-262192 A | 9/1998 |
| JP | 2008-005225 A | 1/2008 |
| JP | 2009-188923 A | 8/2009 |

* cited by examiner

DISPLAY DEVICE

CROSS-REFERENCE TO RELATED APPLICATIONS

This application claims priority to Japanese Patent Application No. 2014-026590 filed on Feb. 14, 2014. The entire disclosure of Japanese Patent Application No. 2014-026590 is hereby incorporated herein by reference.

BACKGROUND

Field of the Invention

The present invention relates to a display device for displaying a program list.

Background Information

The following are known technology for making a program list easier to use.

Japanese Laid-Open Patent Application Publication No. 2009-188923 (Patent Literature 1) relates to a display device, an electronic program list generator, and a computer program with which an electronic program list is displayed simply and in a way that is easier for the user to understand. Patent Literature 1 discloses that program information is displayed for only one of a plurality of programs on the same channel broadcast in the same time period and that each displayed program can be selected.

Japanese Laid-Open Patent Application Publication No. H10-262192 (Patent Literature 2) relates to a program guide display device in which a mark is displayed to indicate that there is a program that is not displayed. Patent Literature 2 discloses that the short duration program guide that is broadcast first out of continuous short duration program guides is displayed, and a more marker is displayed indicating that there are a plurality of short duration program guides that cannot be displayed.

Japanese Laid-Open Patent Application Publication No. 2008-005225 (Patent Literature 3) relates to a program information presentation method. Patent Literature 3 discloses that an EPG is produced for just those programs corresponding to preference information, and when a program box that is not being displayed is selected, program information is displayed and that for short duration programs, such as weather forecasts or news segments lasting about five minutes, the program name will sometimes not be displayed, and if the program selection cursor is used to select such a program, the program name and so forth will be displayed as a pop-up to allow that program to be checked.

Japanese Laid-Open Patent Application No. H09-182035 (Patent Literature 4) relates to an electronic device that omits information about programs with low viewing frequency. Patent Literature 4 discloses that display information is simplified for broadcast programs deemed to have a low reception frequency.

SUMMARY

A function that allows a plurality of channels to be designated and always be continuously recorded has come to be used. This is known by various names, such as "record everything," "record all," "time shift function," and "loop recording," and involves always receiving and recording the broadcast content of a plurality of channels. With a recorder compatible with time shift function, when a recorded program is displayed, it can be given in a program list format, and the user can select programs from this program list.

Since this system is designed to record all programs, when a selection is made, programs of less than five minutes are also presented as a selection option so as to fill in the gaps between programs. If programs that the user does not actively want to see are given as selection options, this can make it harder to select the programs that the user does want to see.

The techniques disclosed in the above-mentioned Patent Literatures relate to a future program list, and do not relate to a past program list as with a time shift function. Also, some do not display programs of short duration, and in addition to being program lists for searching for future programs, they also display short duration programs one by one when the cursor is actually moved over the program list and programs are selected.

Also, regardless of whether or not there is a recording function, a program list is also displayed on the television, which leads to the same inconvenience.

One aspect is to allow a program list to be displayed in a way that is easy to view, and makes it easier to select programs from a past program list that is compatible with a time shift function.

In view of the state of the known technology, a display device is provided that includes a display portion, an input portion that receives an instruction to select a program in a program list such that the display portion displays the program in the program list with the distinguishable expression, and a controller that links a first program having a program duration shorter than a predetermined threshold with at least one second program arranged relative to the first program along a time axis of the program list as a linked program, and that controls the display portion to display the linked program with the distinguishable expression.

Also other objects, features, aspects and advantages of the present disclosure will become apparent to those skilled in the art from the following detailed description, which, taken in conjunction with the annexed drawings, discloses one embodiment of the display device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Figure 1:
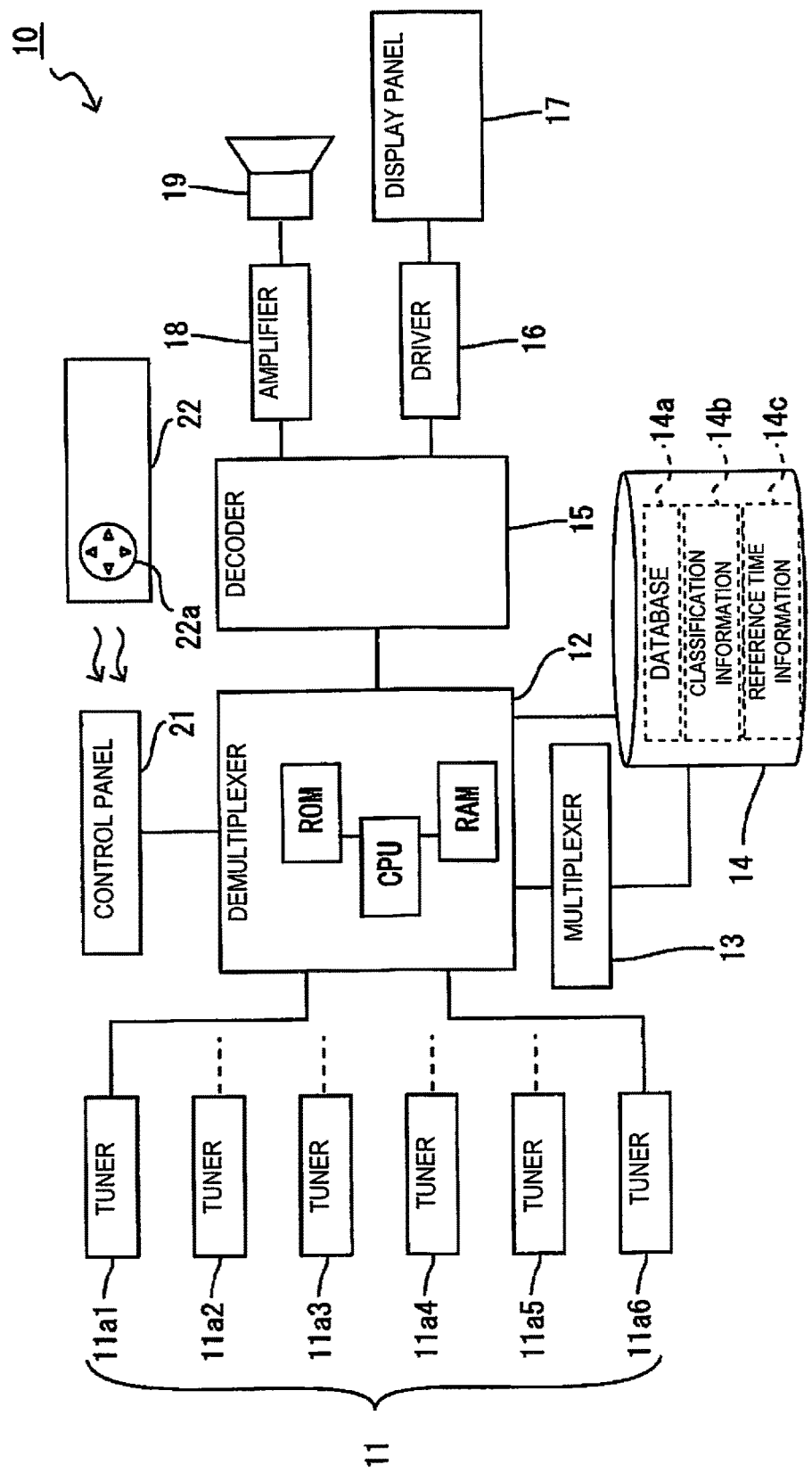
FIG. 1 is a block diagram of a recording and reproduction device in accordance with a first embodiment.

FIG. 1 is a block diagram of a recording and reproduction device 10 (e.g., a display device or a program list display device) pertaining to a first embodiment. In this embodiment, the present invention is applied to a recording and reproduction device, but from the standpoint of displaying a program list of television programs, it can also be applied to a television set or the like. Specifically, after an EPG program list is acquired, the following procedure is applied to the acquired program list.

As shown in FIG. 1, the recording and reproduction device 10 includes six tuners 11 (e.g., digital tuners 11a1 to 11a6). These tuners 11 each includes the functions of a digital terrestrial tuner, a BS tuner, and a CS tuner. Therefore, six television broadcasts can be received at the same time. The signals received by the tuners 11 are demodulated and subjected to error processing, and the resulting demodulated signals are individually inputted to a demultiplexer 12. Although not depicted in FIG. 1, the tuners 11 include a demodulator.

The demultiplexer 12 separates multiplexed signals, but also executes specific programs with a built-in CPU (Central Processing Unit), ROM (Read Only Memory), or RAM (Random Access Memory), and can receive, record, and reproduce television broadcasts by controlling the various components. Specifically, in the illustrated embodiment, the demultiplexer 12 can include a microcomputer or processor with a control program that controls the various components of the recording and reproduction device 10. The demultiplexer 12 can also include other conventional components such as an input interface circuit, an output interface circuit, and storage devices such as a ROM and a RAM. The microcomputer is programmed to control the various components. The internal RAM stores statuses of operational flags and various control data. The internal ROM stores the programs for various operations. The demultiplexer 12 is capable of selectively controlling any of the components in accordance with the control program. It will be apparent to those skilled in the art from this disclosure that the precise structure and algorithms for the demultiplexer 12 can be any combination of hardware and software that will carry out the functions of the present invention. Also, in the illustrated embodiment, the demultiplexer 12 includes the CPU to control the various components. However, of course, the recording and reproduction device 10 can include a CPU separate from the demultiplexer 12.

During recording, a multiplexer 13 extracts and again multiplexes information necessary for recording from the content of the received digital broadcast, and records this to a HDD 14 as a recording region. During reproduction, the demultiplexer 12 reads the data directly from the HDD 14. In addition to the content of digital broadcasts, a database 14a, classification information 14b, and reference time information 14c (discussed below) are also recorded to the HDD 14. The classification information 14b includes genre names and so forth as classification information.

Data read from the HDD 14 or a transport stream of the received digital broadcast is inputted to a decoder 15, separated into video and audio signals, and decoded. The decoded video signals are inputted to a driver 16 and displayed as video on a display panel 17. The decoded audio signals are amplified by an amplifier 18 and outputted as audio from a speaker 19.

The manipulation commands to the recording and reproduction device 10 are acquired via a control panel 21 by the demultiplexer 12 and reflected in specific control. Manipulation commands can also be similarly acquired via a remote control 22. The remote control 22 has a cursor key 22a, and is used in the selection of programs that are highlighted in the program list, for example.

In this embodiment, the tuners 11 correspond to a plurality of tuners that individually receive television broadcasts, the HDD 14 corresponds to a recording means for recording and reproducing the content of television broadcasts, and the demultiplexer 12 corresponds to a full-time recording control means that continuously receives the broadcast content of a plurality of channels designed with the above-mentioned tuners, and records this content with the above-mentioned recording means.

In this embodiment, when the user selects a program to be reproduced from among programs recorded with the time shift function (recorded programs), recording lists are not produced individually, and instead a program list is displayed in table format (a program list in which recorded programs are displayed in the order in which they have been recorded for each channel). The processing procedure when individual programs are displayed in this program list format will be described below.

Figure 2:
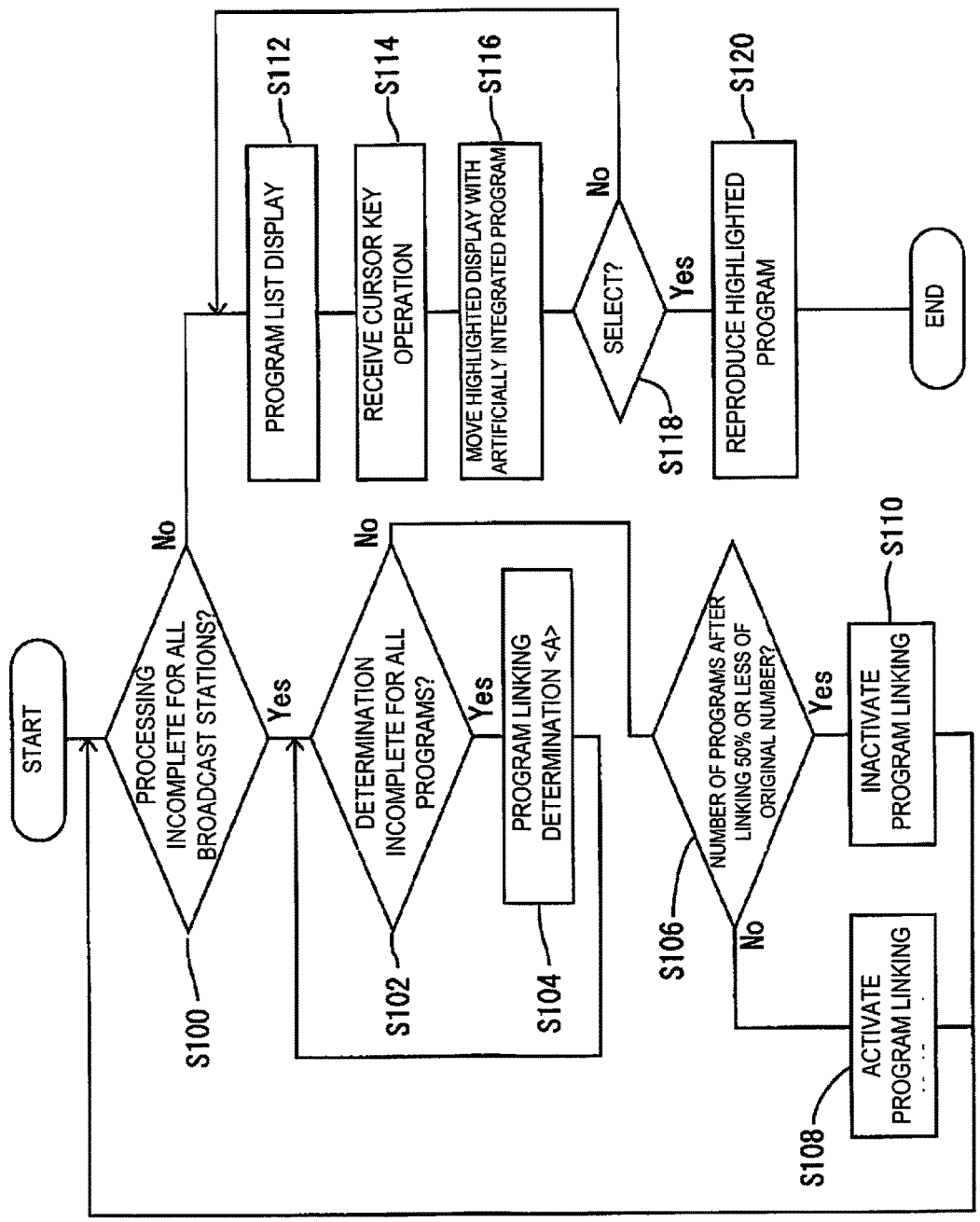
FIG. 2 is a main flowchart of a program list processing procedure performed by the recording and reproduction device.
Figure 3:
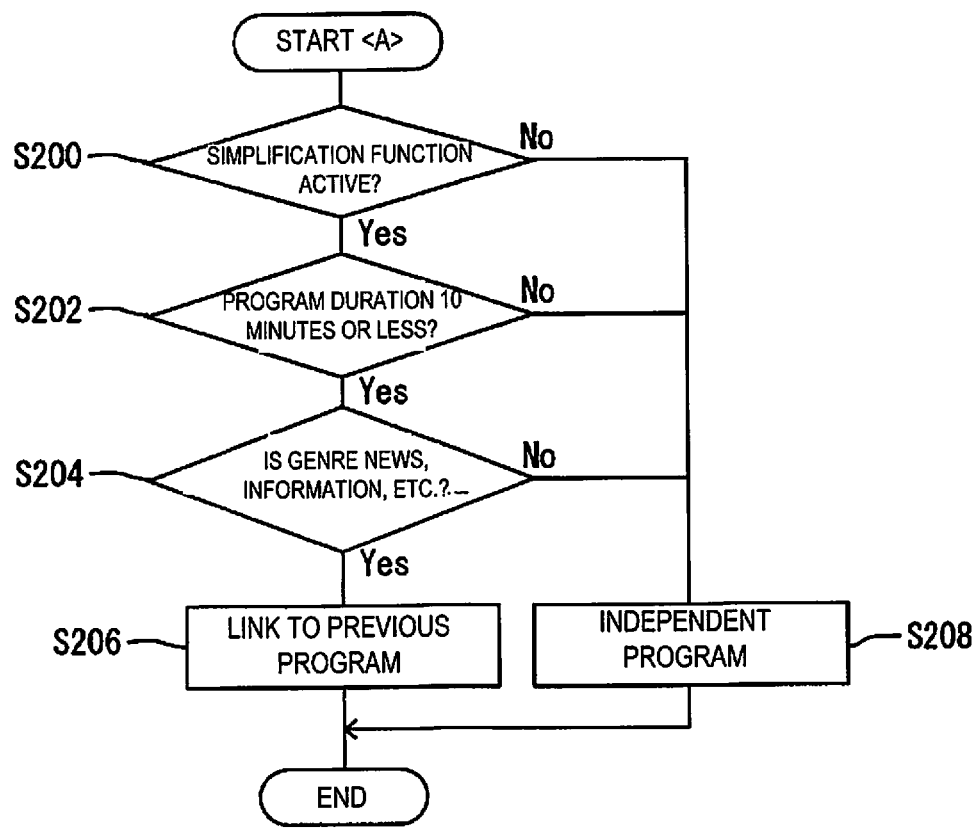
FIG. 3 is a sub-flowchart of the program list processing procedure performed by the recording and reproduction device.

FIG. 2 is a main flowchart of a program list processing procedure performed by the recording and reproduction device 10, and FIG. 3 is a sub-flowchart.

When the user selects a program to be reproduced from among the recorded programs, in S100 the CPU in the demultiplexer 12 (hereinafter referred to simply as CPU) confirms the end condition for loop processing, while performing subsequent processing for each of the broadcast stations (i.e., channels) that have been recorded. In S102, the end condition of loop processing for all of the programs is confirmed, and in S104 program linking determination (<A>) is performed.

Program linking determination (or program linking determination) is a sub-routine, and in S200 the CPU determines whether the simplification function is active. The simplification function can be switched on or off by a specific manipulation on the remote control 22. When the simplification function is switched on, processing is performed to link programs, and when it is switched off, processing to link programs is not performed. Therefore, connecting programs in between two programs (hereinafter referred to as connecting programs) are also displayed in the program list, and when the cursor key 22a is used to move a highlighted program, the connecting program also becomes a program, and there is no movement to the next program unless the cursor key 22a is depressed. Meanwhile, when programs have been linked, even though they were originally two programs, they are now considered as one, and the highlighting can be moved to the program of the adjacent box (moved in the adjacent direction) by pressing the cursor key 22a once.

When the simplification function is on and active, in S202 it is determined whether or not the program duration is 10 minutes or less. The program duration is the broadcast duration for each program, and is included in program information recorded along with content during the recording of a program. If it is not included in the program information, however, then the program start time and the start time of the program that follows in time order can be acquired, and the length of time between the two considered to be the broadcast duration.

In this embodiment, a reference duration with respect to the broadcast time is provided as a reference for determining whether or not a program is a connecting program, and if the broadcast duration is shorter than this reference duration, then it is given as a candidate to be artificially integrated or linked. The reference duration is not limited to being 10 minutes, and may be set either longer or shorter than this. Also, in the integration or link, only programs that are adjacent on a time line are considered.

The CPU in S204 acquires the genre of a program, and determines whether or not that genre is applicable to program linking. When program information (EPG information) is acquired from a future program list, genre information can also be acquired, and this genre information can be recorded along with the content and used after recording.

Genres based on broadcast standards, such as ATSC standards, DVB-T, ISDB-T, and the like, can be broadly classified into the following main categories: news/reportage, sports, informational/tabloid shows, drama, music, variety, movies, animation/special effects, documentary/cultural, live theater/performance, hobby/educational, public service, and so forth. Genres that are often associated connecting programs in between main programs will be "news/reportage, informational/tabloid shows, etc."

Therefore, a program is to be linked if it is no more than 10 minutes long and its genre is "news/reportage, informational/tabloid shows, etc." Depending on the broadcast standards, there may also be genres that are further classified into sub-categories. In this embodiment, the determination is made from the main category, but may instead be made from a sub-category. Also, the selection can be made by user settings.

If a program is determined to meet the conditions in both S202 and S204, the CPU links it to the previous program in S206. This processing for linking does not involve linking the content itself, and instead information indicating "linking to the previous program" is added to the program information. By referring to this recording region, when a program list is displayed, the display indicates that artificial integration or link has been performed, and when the highlighted display is moved, the integrated or linked programs are moved all at once with a single operation of the cursor key 22a. The processing in S202 to S206 corresponds to the program integration means.

Meanwhile, if it is determined that the simplification function is not active, or that the broadcast duration (the length of a program) is more than 10 minutes, or that the genre is not applicable to program linking, then in S208 the program is processed as an independent program. That is, no processing is performed to add information of "linking to the previous program" to the program information.

Once the sub-routine for program linking determination is thus finished, the flow returns to the main flowchart.

If it has been determined in S102 that a program linking determination is performed in loop processing, the CPU in S106 determines whether or not the number of linked programs is no more than 50% of the original number.

When considered in broadcast station units, there are broadcast stations that focus on a particular genre, and those that broadcast many short programs. If program linking is performed for these broadcast stations under the same conditions as for ordinary broadcast stations, it is conceivable that nearly all of the programs will end up being linked, making the program list incomprehensible. Therefore, no simplification is performed for broadcast stations in which the number of programs after linking processing is less than 50% of the original number of programs. Naturally, this 50% used as a reference here can be varied as needed. Also, it need not be fixed, and may be changed according to the broadcast duration or the day of the week. It is also possible to design the system so that even short programs are not linked during morning hours, and are more likely to be linked during other times of the day. Also, the reference may be varied to better reflect local situations.

In S106, if the number of linked programs is less than 50% of the original number, the program linking is deactivated in S108, and if this number is not less than 50%, program linking is activated. When program linking is deactivated, the information indicating "linking to the previous program" that has been added to the program information in S206 is deleted, and no processing is performed when the program linking is activated. However, instead of adding to the program information in S206, processing just to raise a flag may be performed for every program in a temporary recording area at that point, and information indicating "linking to the previous program" may be added to the actual program information at the point when it is decided to activate the program linking in S108.

The above is done for each broadcast station, and it is determined whether program linking is to be performed for all of the programs on all of the broadcast stations. If the capacity specified for the HDD 14 is exceeded, programs recorded by time shift function are deleted in order, starting with the oldest. Whether to perform program linking is determined for all of the recorded programs, but when a program to be reproduced is selected, it takes time to determine whether to perform program linking for all of the recorded programs each time, so flags marking whether the determination has been made or not may be attached, and only those programs marked with a flag indicating not yet determined may be targeted.

Thus, the following are the conditions for determining which programs are to be linked.

1: The simplified display function is on

This function is switched by selecting a category in a setting menu, or by selecting a switch button in the display of a program list.

2: The program is shorter than the reference duration

Since nearly all programs that are sandwiched between main programs are 10 minutes or less in length, the reference duration is 10 minutes.

3: The program is of a specified genre
News/reportage, informational/tabloid shows, etc.

4: Characteristics are determined for each broadcast station

The number of programs after linking processing is not less than 50% of the original number of programs.

Figure 4:
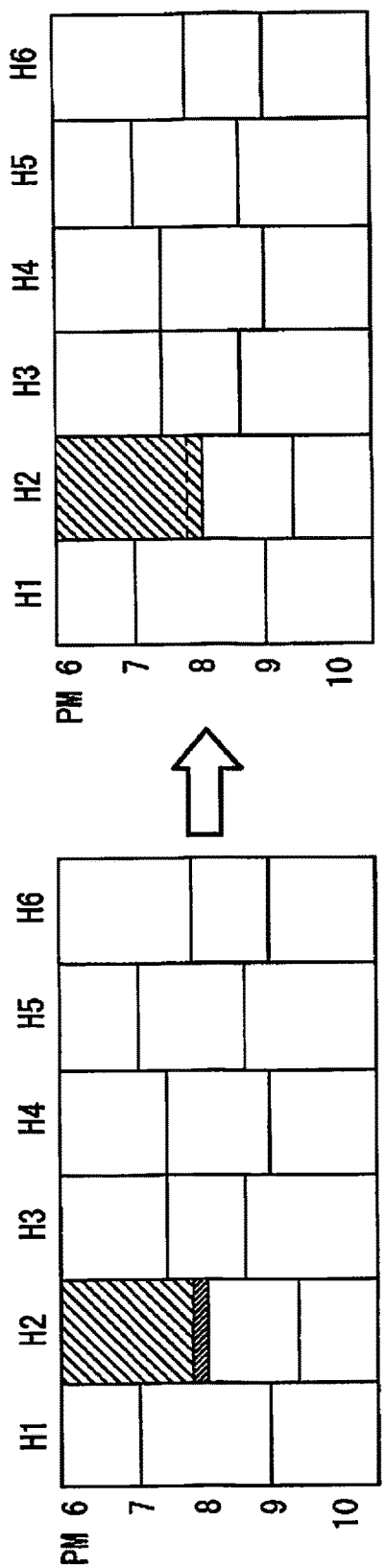
FIG. 4 is a diagram showing a program list before and after processing.

FIG. 4 is a diagram showing a program list before and after processing. In the program list, the vertical axis is time (e.g., a time axis), and the horizontal axis is displayed in a table format for each broadcast station. In this drawing, recorded programs are displayed from an H1 broadcast station to an H6 broadcast station, and the time axis shows from 6:00 until 10:30 p.m.

Before processing, on the H2 broadcast station, there are two programs: a program from 6:00 until 7:55 p.m. (e.g., a second program), and a program from 7:55 until 8:00 p.m. (e.g., a first program). By contrast, after processing is performed to link programs, there is only one program (e.g., a linked program) on the program list, from 6:00 until 8:00 p.m.

FIGS. 5 to 8 show specific examples of a program list. Examples of what the display looks like when the flowcharts of FIGS. 2 and 3 are actually implemented to eliminate programs (program linking) will now be given. In these drawings, the broadcast durations of programs B and C (the length of the programs) are assumed to satisfy the condition for being eliminated (a reference duration of 10 minutes). Even so, since programs B and C are of different genres, the result of elimination (program linking) differs.

Figure 5:
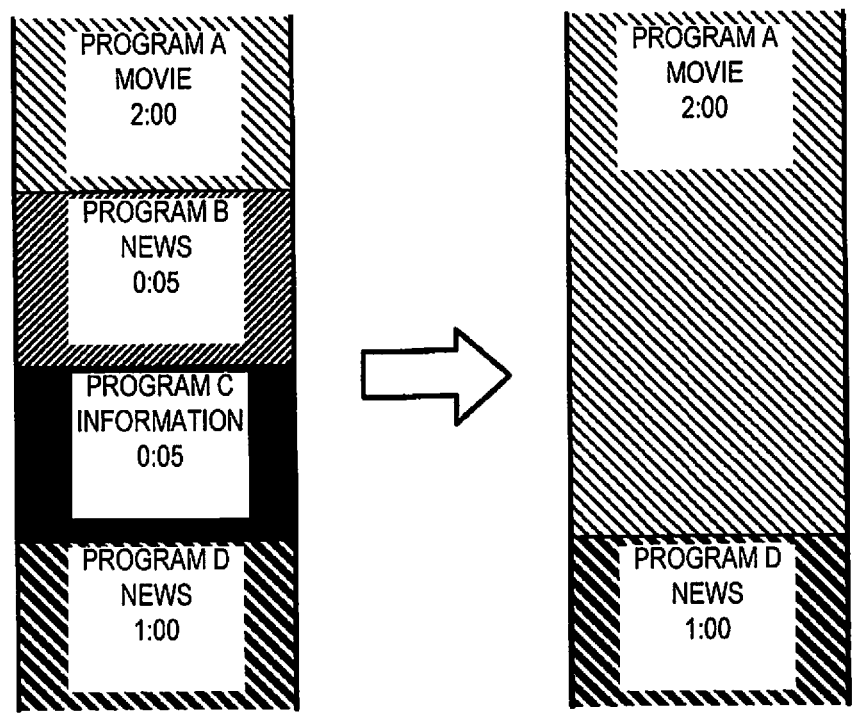
FIG. 5 is a diagram showing a specific example of a program list integration.

In the case of FIG. 5, the genre of program B is "news," and the genre of program C is "information." Since both of these meet the condition for elimination, they are linked to program A, which is the previous program. Thus, when program B is linked to and integrated or linked with the previous program A, if it is determined that the next program C is also to be linked, it is further linked to the previous, integrated program A.

Figure 6:
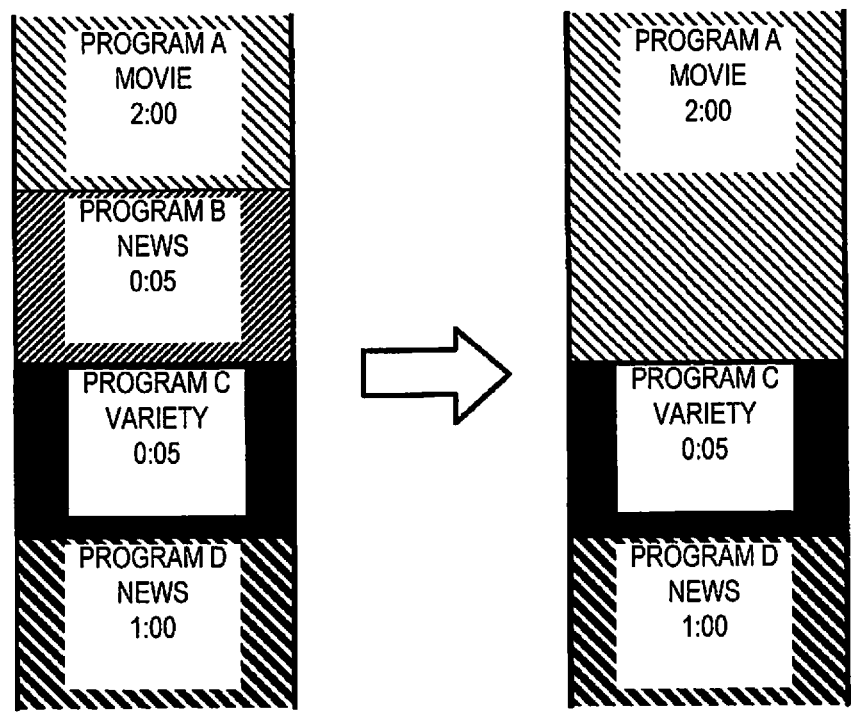
FIG. 6 is a diagram showing a specific example of a program list integration.

In the case of FIG. 6, the genre of program C is "variety," which does not meet the elimination condition. Accordingly, only program B, which does meet the elimination condition, is linked to program A.

Figure 7:
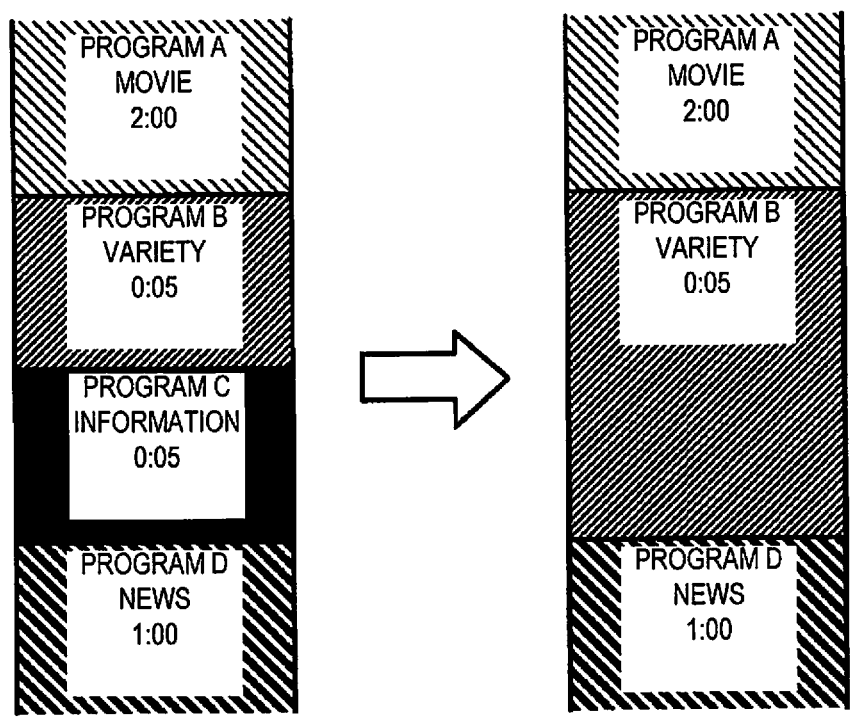
FIG. 7 is a diagram showing a specific example of a program list integration.

In the case of FIG. 7, the genre of program B is "variety," and the genre of program C is "information." Since only program C meets the condition for elimination, program C is linked to program B. That is, a program that is shorter in length than the reference duration is a candidate for being linked to the previous program, but even so, it is also a linking object to which the following program will be linked. In the situation shown in the drawing, the five-minute program C is linked to the five-minute program B.

Figure 8:
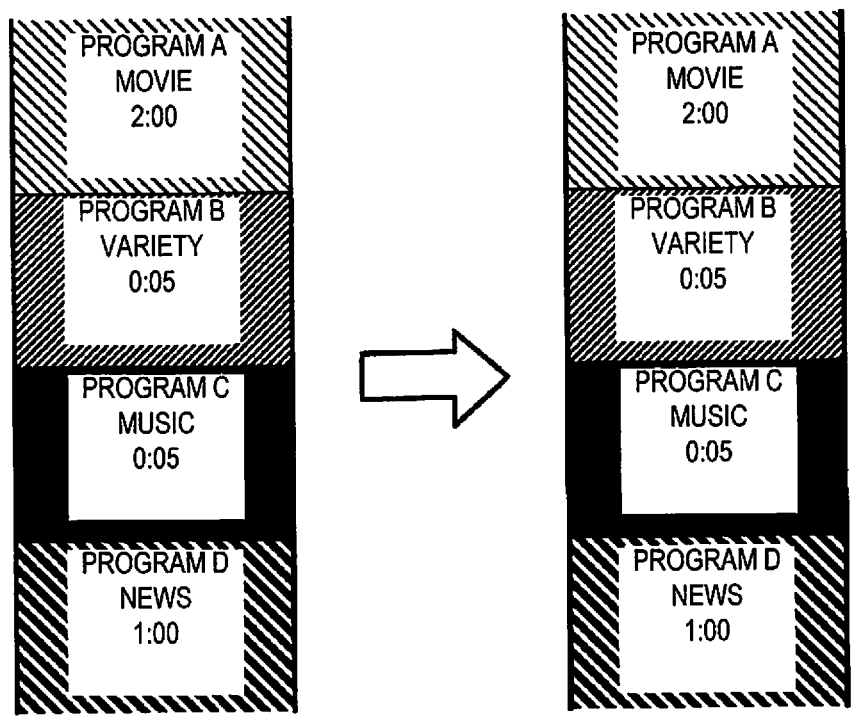
FIG. 8 is a diagram showing a specific example of a program list integration.

In the case of FIG. 8, neither program B nor program C is of a genre that is an object of elimination. Therefore, the display remains in its original form.

Returning to FIG. 2, in S112 the CPU gives a program display. The processing of S112 corresponds to the program list production means.

The simplification function is premised on the fact that there is a program that is linked and whose display has been eliminated in the displayed range, so it is helpful if there is some way to know that a portion of the displayed contents of the program list has been eliminated.

Figure 9:
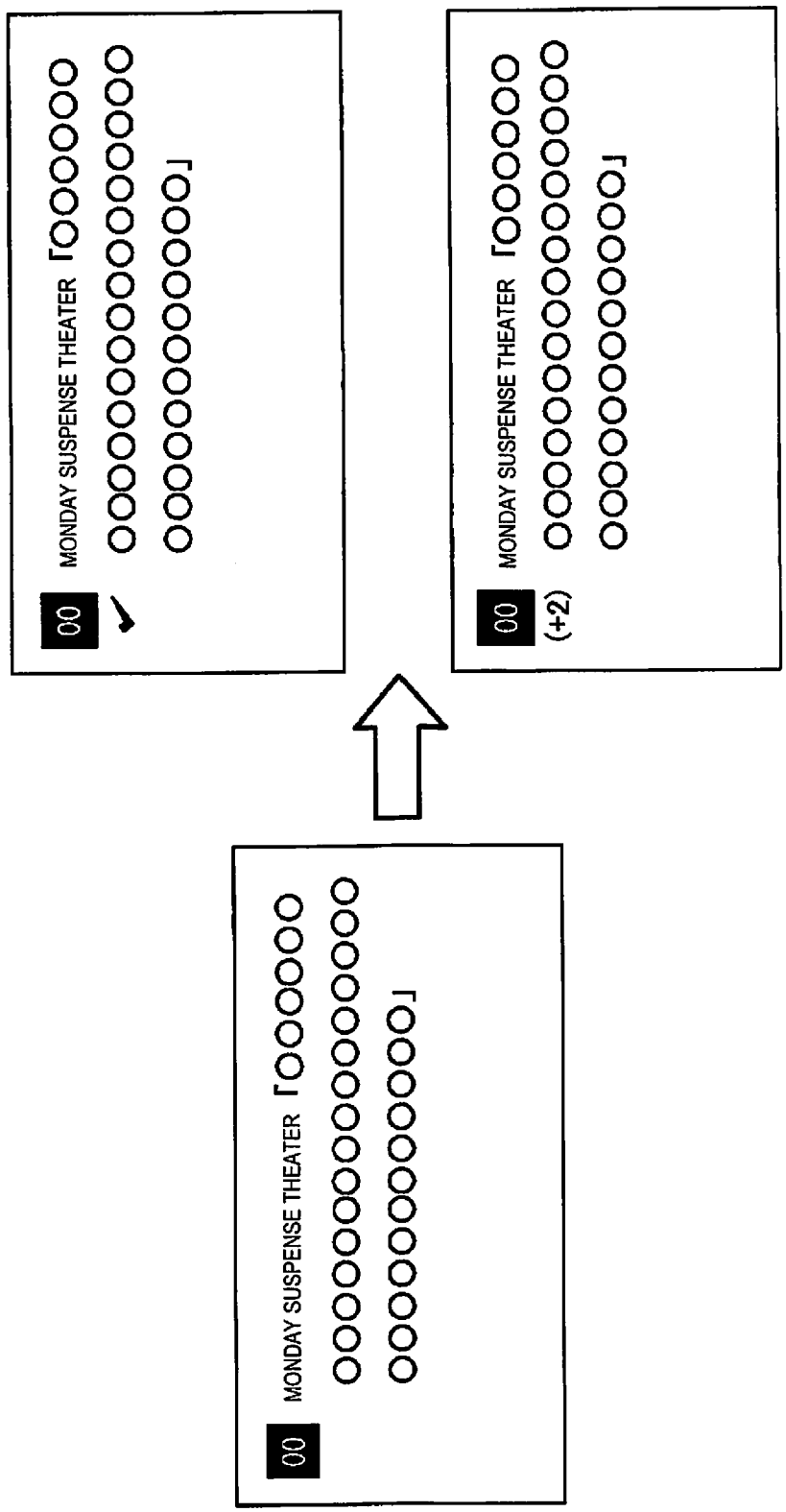
FIG. 9 is a diagram showing a display example of a program list.

FIG. 9 is a diagram showing the display of such a program list. If we assume that the display when there is no linking is shown on the left in the drawing, an icon indicating that a category has been eliminated from the ordinary program display is added to the display at the top right. How many programs have been eliminated is displayed by a numerical value in the display at the bottom right. Naturally, other display methods are also possible.

After the program list has been displayed, the CPU receives operation of the cursor key 22a (corresponds to cursor manipulation) in S114. More specifically, when the cursor key 22a on the remote control 22 is operated, an infrared signal corresponding to this operation is sent to the control panel 21, and this is detected by the CPU in the demultiplexer 12.

The operation of the cursor key 22a corresponds to moving a program that is highlighted in the program list to a program that is adjacent on the top, bottom, left, or right side. The CPU temporarily stores information about which program is highlighted, and the highlighted program is changed according to operation of the cursor key 22a. Here, when the cursor key 22a is pressed once in any direction, the highlighted display moves to the adjacent program. Two moves cannot be made at once.

The processing of S114 and S116 corresponds to the program movement means. The processing to move the highlighted display (cursor movement) in S116 corresponds to a case in which the program integration means causes the program movement means to move the highlighted display in artificially integrated program units.

When the highlighted display is moved, in S116 the CPU moves the highlighted display as an artificially integrated program. That is, if we assume that a subsequent program is linked to a previous program in S206, even though there were a plurality of programs to start with, they will be displayed as just one program in the program list, and when the cursor key 22a is pressed one time, a plurality of programs will be treated as a unit in the movement of the highlighted display.

After this, when the user hits an enter key or the like to reproduce the highlighted program, the CPU determines that a selection has been made in S118, and in S120 executes processing related to the reproduction of the highlighted program.

In the illustrated embodiment, as shown in FIG. 1, the recording and reproduction device 10 (e.g., the display device) includes the display panel 17 (e.g., a display portion), the control panel 21 or the remote control 22 (e.g., an input portion), and the CPU (e.g., the controller). The display panel 17 is configured to display a particular program in the program list with highlight (e.g., a distinguishable expression). The control panel 21 or the remote control 22 is configured to receive an instruction to change a program that is displayed in the program list with the distinguishable expression from the particular program to an adjacent program adjacent to the particular program to display the adjacent program with the highlight. In particular, the control panel 21 or the remote control 22 is configured to receive an instruction to select a program in the program list such that the display portion displays the program in the program list with the highlight. As shown in FIG. 4, for example, the CPU is configured to link a first program (in FIG. 4, a program from 7:55 until 8:00 p.m., for example) having a program duration shorter than the reference duration (e.g., the predetermined threshold) with at least one second program (in FIG. 4, a program from 6:00 until 7:55 p.m., for example) arranged relative to the first program along the time axis of the program list as one program (e.g., a linked program). The CPU is also configure to control the display panel 17 to display the one program (e.g., the linked program) with highlight.

In the illustrated embodiment, the CPU is further configured to link the first program with the at least one second program that is arranged directly or indirectly adjacent to the first program along the time axis of the program list, as shown in FIG. 4, for example.

In the illustrated embodiment, the CPU is further configured to link the first program with the at least one second program that is arranged before the first program along the time axis of the program list, as shown in FIG. 4, for example. However, alternatively or additionally, the CPU can be further configured to link the first program with the at least one second program that is arranged after the first program along the time axis of the program list.

In the illustrated embodiment, the CPU is further configured to link the first program that has a specific genre such as news/reportage, informational/tabloid shows, etc. with the at least one second program, as shown in FIG. 3, for example.

In the illustrated embodiment, the reference duration (e.g., the predetermined threshold) is settable to different value.

In the illustrated embodiment, the distinguishable expression includes the icon or the numerical value (e.g., a marker) indicating that the integration or link (e.g., the program link) has been performed, as shown in FIG. 9, for example. Alternatively or additionally, the marker includes a program boarder between the first program and the at least one second program, for example, that is thicker than a program boarder of non-linked program.

In the illustrated embodiment, the display panel 17 can be further configured to display the linked program with a background color instead of the highlight. Also, the display panel 17 can be further configured to display the linked program with a bold text than that of another program instead of the highlight.

Also, in the illustrated embodiment, the first program and the at least one second program are arbitrarily selectable. For example, the first program and the at least one second program can be selectable even if the first program and the at least one second program are spaced apart in the program list.

In the illustrated embodiment, the CPU is further configured to link the first program with the at least one second program while a number of programs in the program list after linking the first program with the at least one second program is not less than a specific proportion relative to a number of programs in the program list before linking the first program with the at least one second program, as shown in FIG. 2, for example. In the illustrated embodiment, the specific proportion is 50%, as shown in FIG. 2, for example.

In the illustrated embodiment, as shown in FIG. 1, the recording and reproduction device 10 further includes the tuners 11 (e.g., at least one tuner), and the HDD 14 and the demultiplexer 12 (e.g., a record and reproduction portion). The tuners 11 are configured to receive television broadcast signals, respectively. The HDD 14 and the demultiplexer 12 are configured to record and reproduce the television broadcast signals. The display panel 17 is further configured to display program information of programs recorded by the HDD 14 and the demultiplexer 12 in accordance with channels and recording orders of the programs in the program list.

In the illustrated embodiment, the CPU is further configured to link the first program with the at least one second program by providing the first program with linking information.

Second Embodiment

Figure 10:
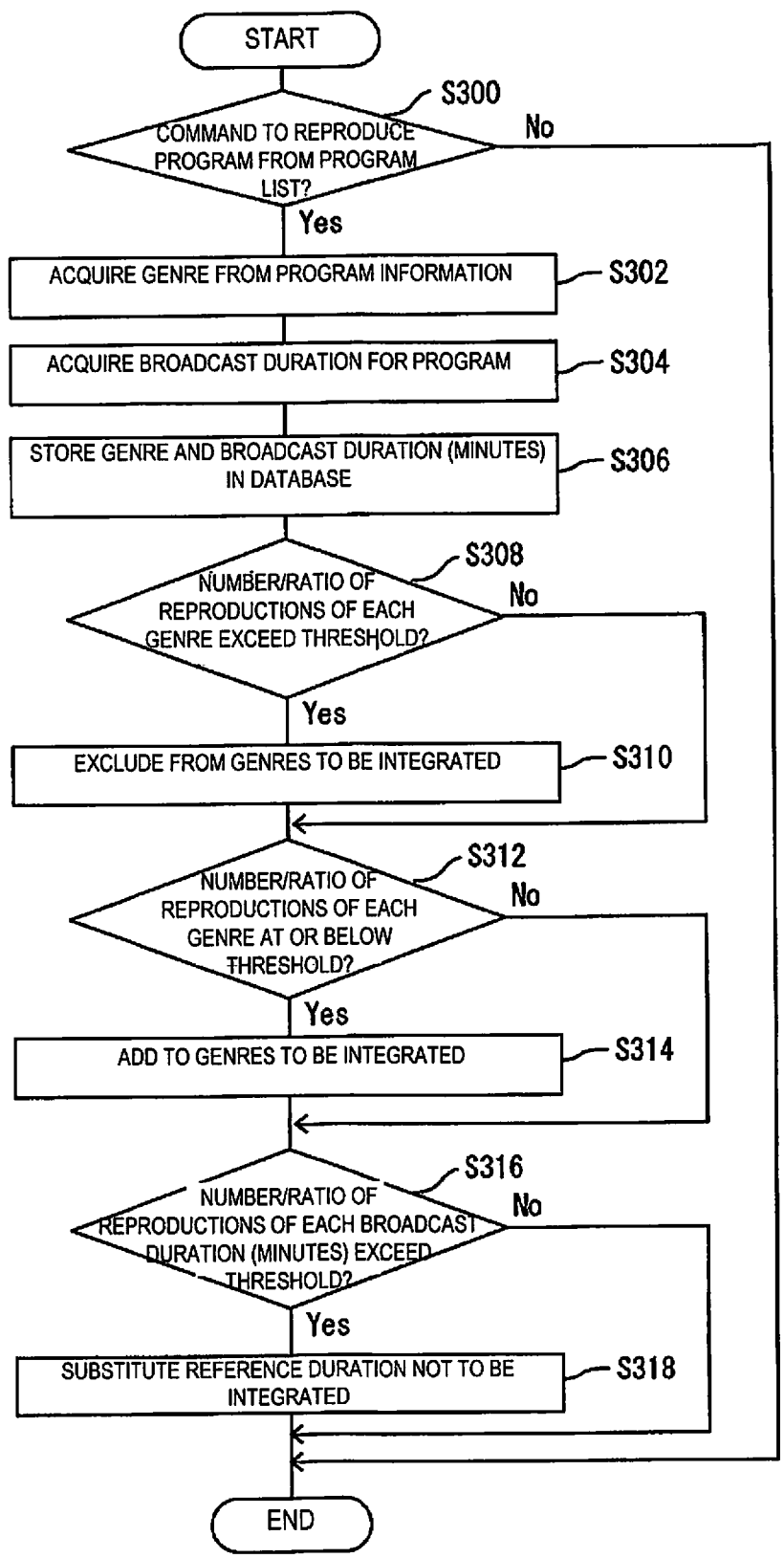
FIG. 10 is a flowchart of a processing procedure for a program list in a recording and reproduction device in accordance with a second embodiment.

Referring now to FIG. 10, a recording and reproduction device (e.g., a display device or a program list display device) in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

With the program linking conditions in the first embodiment, the above-mentioned initial values are used for the various determination criteria. Naturally, these can be varied according to user settings. In this embodiment, however, the viewing preferences (e.g., viewing history) of the user are automatically reflected in the changes to these criteria.

FIG. 10 is a flowchart of a processing procedure for a program list in the recording and reproduction device in accordance with the second embodiment.

As discussed above, the program to be reproduced is selected from the program list. Therefore, in S300 the CPU determines whether a command has been issued to reproduce a program from the program list (corresponds to a reproduction operation), and if reproduction has been commanded, in S302 the genre is acquired from the program information, and in S304 the broadcast duration of the program is acquired. Then, in S306, the genre and broadcast duration (minutes) are stored in the database 14a of the HDD 14. This procedure is repeated to steadily build up the genres and broadcast durations of programs selected by the user. Statistical processing of this information allows the user's preferences to be estimated.

Based on the accumulation of data in the database 14a, in S308 the CPU determines whether the number and ratio of reproductions of each genre have exceeded a threshold. There are a finite number of genres, since the main categories for genres of broadcast standards are employed. Therefore, the number of times each genre has been reproduced can be ascertained by referring to the database 14a. During the period when little data has been accumulated, this is ignored since there are so few reproductions. As the number of reproductions increases, however, more data builds up and statistical processing becomes possible. Since the genres that are reproduced the most often are the genres preferred by the user, in S310 those genres are excluded from genres to be integrated or linked. As an initial value, the genre of "news/reportage, informational/tabloid shows, etc." is the genre to undergo program linking, but if news programs are frequency reproduced, they are excluded from the programs to be linked. Genres are stored in the classification information 14b, and all genres as well as the genres to undergo program linking are recorded. When a genre is excluded from those to undergo program linking, it is excluded from the latter recording.

As time passes, the number of reproductions will naturally increase, so it is also possible to utilize the ratio of the number of times each individual genre has been reproduced with respect to the total number of reproductions, instead of just the number of reproductions.

Meanwhile, the genres that do not undergo program linking need not be fixed. Accordingly, in S312 the CPU determines whether the number and ratio of reproductions of each genre is at or below a threshold value. If the number or ratio of reproductions is extremely low, the program list will look cleaner if a lot of programs are quickly added to those that are linked. Therefore, if the number or ratio of reproductions of each genre is under a certain threshold value (ratio), in S314 there will be additional genres to be integrated or linked that are recorded to the classification information 14b.

The reference duration for the broadcast duration is ten minutes, but this reference duration will vary. In S316 the CPU determines whether the number or ratio of reproductions of each broadcast duration (minutes) has exceeded a threshold value. Even with short programs, if the user actively selects them, then broadcast durations (minutes) of relatively short length will build up in the database 14a. For instance, if programs with a broadcast duration of five minutes are reproduced frequently, the user is intentionally selecting those programs from the program list, so even though they only last five minutes, it is better for them not to be eliminated from the program list, so that the user can still select them. Accordingly, in S318, relatively short broadcast duration that is reproduced frequently is replaced for the reference duration that is not integrated, as the reference time information 14c.

In this way, the preferences of the user are automatically reflected. However, some users like for their preferences to be thus automatically reflected, and some do not, so the system allows the user to choose either way through the settings. Also, when the settings are made by the user, the process can be facilitated by allowing the user to specify the genre and length of programs that will be subject to elimination, based on the viewing preferences up to that point, as discussed above. As will be described below, the processing of S300 to S318 corresponds to the preference acquisition means.

In the illustrated embodiment, as shown in FIG. 1, the recording and reproduction device 10 further includes the HDD 14 (e.g., the memory) configured to store viewing preferences (e.g., program viewing history) according to program viewing instructions. Also, as shown in FIG. 10, the CPU is further configured to link the first program with the at least one second program based on the viewing preferences.

Specifically, in the illustrated embodiment, the CPU (e.g., the controller) is further configured to link the first program that has a genre that is not included in a genre of the viewing preferences, as shown in S308 to S314 in FIG. 10, for example.

Furthermore, in the illustrated embodiment, the CPU is further configured to link the first program that has the program duration that is shorter than the program duration of the viewing preferences, as shown in S316 and S318 in FIG. 10, for example. In particular, the CPU uses the program duration of the viewing preferences as the reference duration.

Third Embodiment

Figure 11:
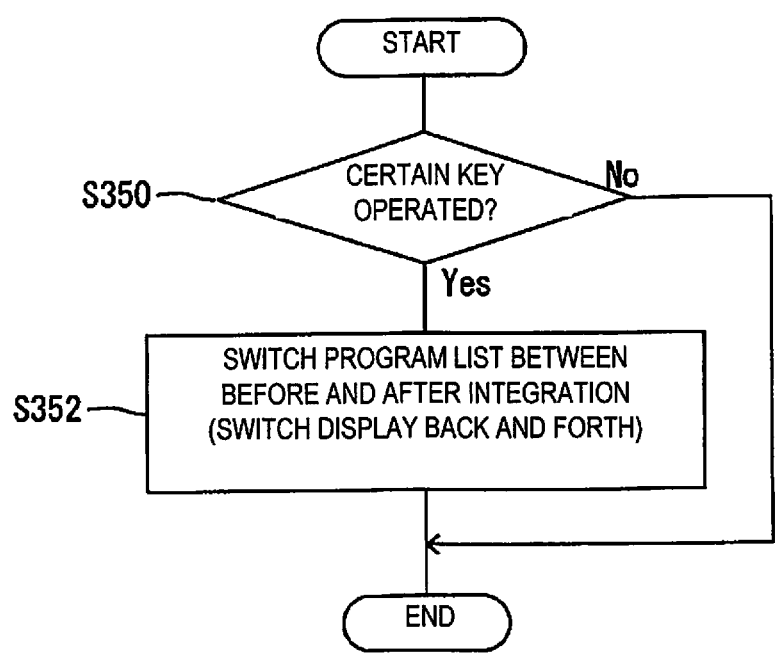
FIG. 11 is a flowchart of a processing procedure for a program list in a recording and reproduction device in accordance with a third embodiment.
Figure 12:
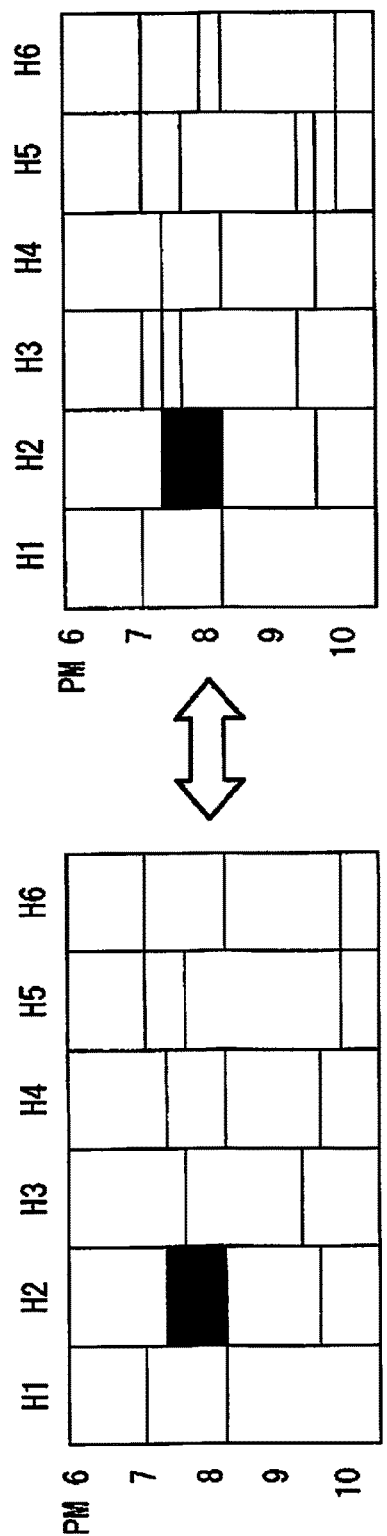
FIG. 12 is a diagram showing a display example of the program list.

Referring now to FIGS. 11 and 12, a recording and reproduction device (e.g., a display device or a program list display device) in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In performing the simplification function, the recording and reproduction device also has a function that allows program information that is not originally eliminated to be easily displayed.

FIG. 11 is a flowchart of a processing procedure for a program list in the recording and reproduction device in accordance with the third embodiment.

With this embodiment, in S350 the CPU determines whether a certain key has been operated on the remote control 22, and if it has been operated, in S352 the program list is switched between before and after integration. Specifically, the displayed is switched back and forth.

FIG. 12 is a diagram showing a display of the program list. In this drawing, a program list that has undergone artificial integration or link of programs is shown on the left, and the original program list that has not undergone this artificial integration or link of programs is shown on the right. The display switches between these left and right displays every time a certain key on the remote control 22 is pressed. With the program list shown on the left, there are almost no short program boxes, and it can be seen that they have been eliminated. With the program list shown on the right, however, the short program boxes are displayed, without being eliminated. The program list on the left not only has a cleaner looking display, but the cursor key 22a, which has to be pressed to move a highlighted program, is pressed fewer times.

Thus, in this embodiment, a simplified display is switched on and off by pressing a certain key, thereby switching between simplified display and ordinary display.

In the illustrated embodiment, as shown in FIGS. 11 and 12, the display panel 17 (e.g., the display portion) is further configured to switchably display program lists before and after linking the first program with the at least one second program.

Fourth Embodiment

Figure 13:
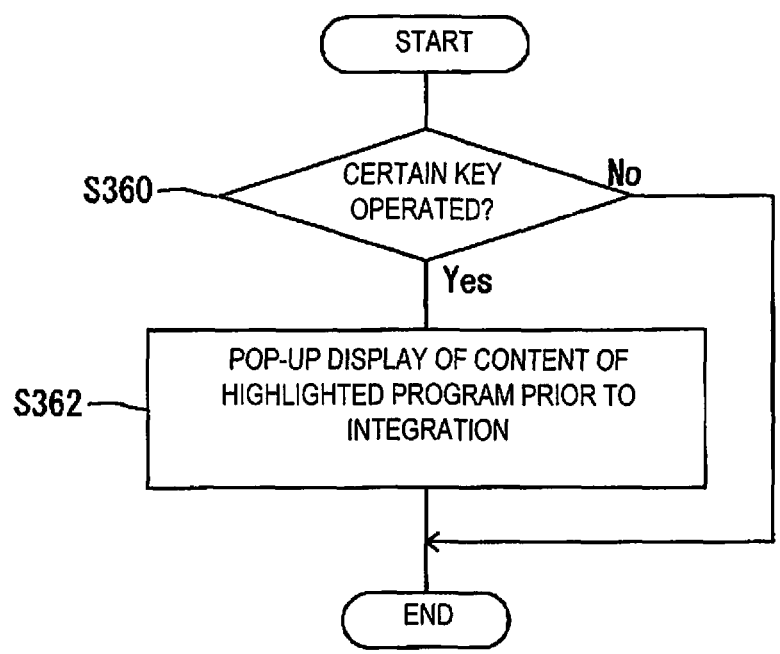
FIG. 13 is a flowchart of a processing procedure for a program list in a recording and reproduction device in accordance with a fourth embodiment.
Figure 14:
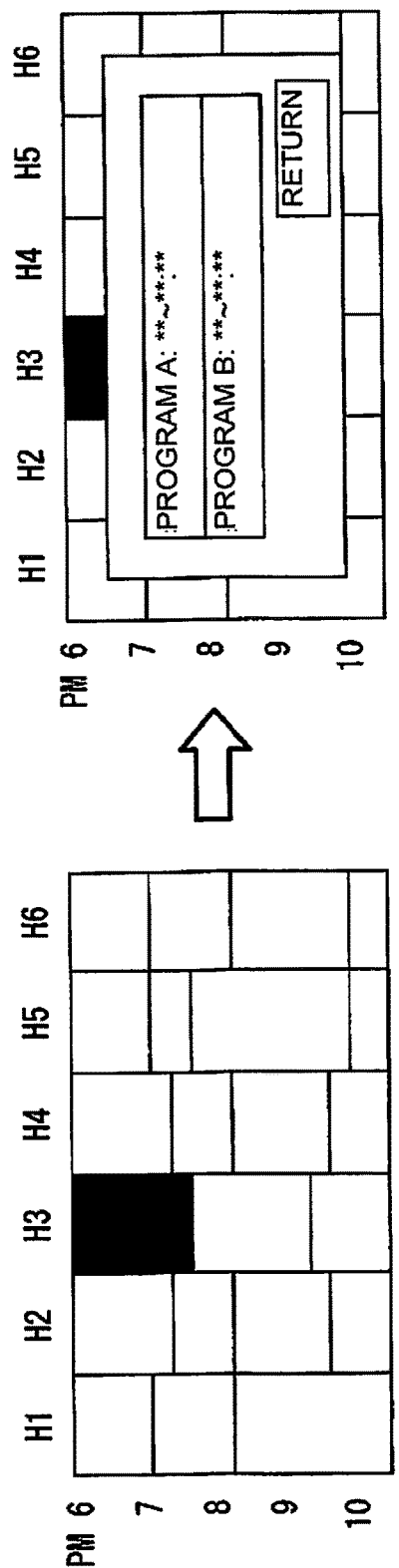
FIG. 14 is a diagram showing a display example of the program list.

Referring now to FIGS. 13 and 14, a recording and reproduction device (e.g., a display device or a program list display device) in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

FIG. 13 is a flowchart of a processing procedure for a program list in the recording and reproduction device in accordance with the fourth embodiment.

In this embodiment, in S360 the CPU determines whether a certain key on the remote control 22 has been operated, and if it has been operated, in S362 the content of the highlighted program prior to integration or link is displayed as a pop-up.

FIG. 14 is a diagram showing a display of the program list. In this drawing, a program list that has undergone artificial integration or link of programs is shown on the left, and a program list in which there is a pop-up display of the content of a highlighted program prior to integration or link is shown on the right. More specifically, if a certain key is operated when a program on the H3 broadcast station starting at 6:00 p.m. is highlighted, a pop-up display is given to show the content of a plurality of programs (program A and program B) prior to integration or link, as shown on the right.

Thus, with this embodiment, if a certain key is pressed while a linked program that includes an eliminated program is highlighted, information about the linked program will appear as a pop-up display on the program list. Also, during the pop-up display, only the targeted program can be selected, and the user can return to the program list by pressing a return key or the like.

In the illustrated embodiment, as shown in FIGS. 13 and 14, the display panel 17 (e.g., the display portion) is further configured to show program information of the first program and the at least one second program while displaying the linked program with the highlight (e.g., the distinguishable expression).

Fifth Embodiment

Figure 15:
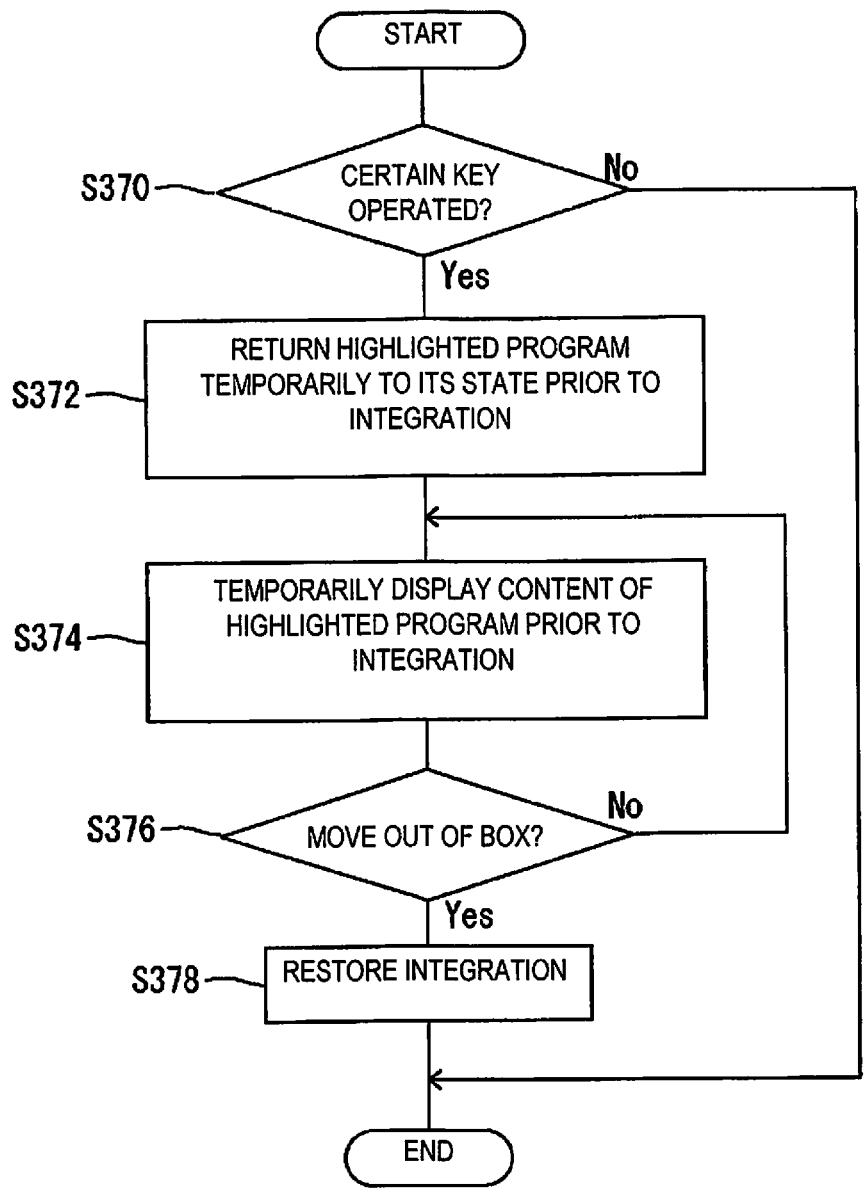
FIG. 15 is a flowchart of a processing procedure for a program list in a recording and reproduction device in a fifth embodiment.
Figure 16:
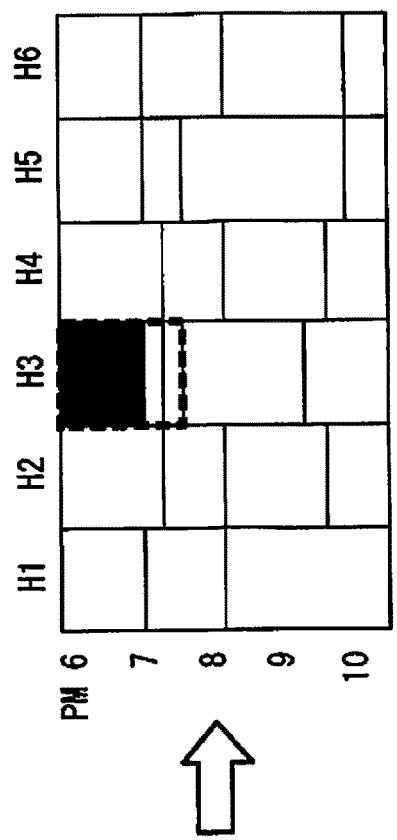
FIG. 16 is a diagram showing a display example of the program list.
Figure 16:
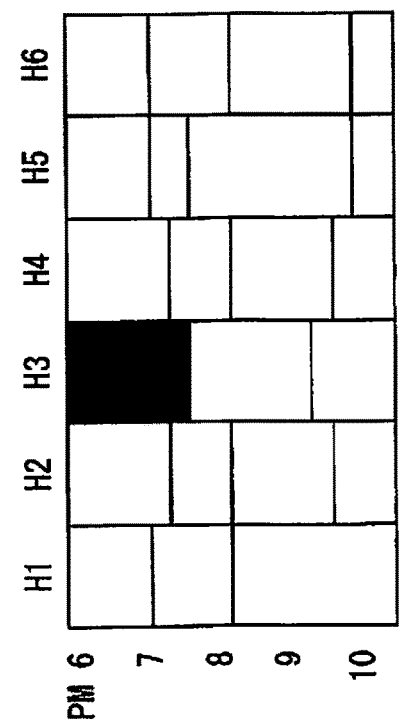

Referring now to FIGS. 15 and 16, a recording and reproduction device (e.g., a display device or a program list display device) in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

FIG. 15 is a flowchart of a processing procedure for a program list in the recording and reproduction device in accordance with the fifth embodiment.

In this embodiment, in S370 the CPU determines whether a certain key has been operated on the remote control 22, and if it has been operated, in S372 processing is performed to return the highlighted program temporarily to its state prior to integration or link. Even if information linked to the previous program has been attached, this information is temporarily ignored. Then, in S374 the CPU displays the content of the highlighted program prior to being integrated linked.

If this is done, when the user attempts to move down with the cursor key 22a, the linking of a plurality of programs is temporarily released, and as a result the highlighted display moves from one program to the next.

When the highlighted display moves out of a box, in S376 the CPU senses this, so in S378 the state in which integration or link is temporarily released is restored to a state of integration or link.

FIG. 16 is a diagram showing a display of the program list. If a certain key is operated when a program on the H3 broadcast station starting at 6:00 p.m. is highlighted, the program box from after integration or link is tentatively shown as on the right, and the display is switched so that the user can see the content of a plurality of programs (program A and program B) prior to integration or link. Even if the cursor key 22a is operated in this state, the highlighted display will move one by one within the tentative program box.

If the cursor key 22a is operated further to go beyond the tentative program box, the state will revert back to what is shown on the left.

Thus, pressing a certain key when a linked program that includes an eliminated program is highlighted returns just the highlighted part to its normal display. This temporarily puts the display back to what it has been, and returns to a state of the original linked display at the point when the position of the highlighting went outside the range.

In the illustrated embodiment, as shown in FIGS. 15 and 16, the display panel 17 (e.g., the display portion) is further configured to show the first program and the at least one second program in the program list while displaying the linked program with the highlight (e.g., the distinguishable expression).

It should go without saying that the present invention is not limited to the above embodiments. And while it will be obvious to a person skilled in the art, the following are disclosed as embodiments of the present invention:

the combinations of the interchangeable members, configuration, and so forth disclosed in the above embodiments can be suitably changed;

although not disclosed in the above embodiments, interchangeable members, configuration, and so forth may be suitably substituted for the members, configuration, and so forth that are prior art and are disclosed in the above embodiments, and the combinations thereof may also be changed; and although not disclosed in the above embodiments, members, configuration, and so forth that can be imagined by a person skilled in the art, on the basis of prior art and the like, as replacements for the members, configuration, and so forth disclosed in the above embodiments can be suitably substituted, and the combinations thereof can be changed.

In the illustrated embodiment, a program list display device is provided that acquires and displays a program list. The program list display device includes a program movement means for highlighting the display of a particular program in the program list, receiving cursor manipulation, and moving a program that is highlighted on the program list in the adjacent direction corresponding to the cursor manipulation, and a program integration means for artificially integrating programs that are adjacent on a time axis and moving a cursor with the program movement means.

With the above configuration, the program movement means highlights the display of a particular program on the program list, receives the cursor manipulation, and moves a program that is highlighted on the program list in the adjacent direction corresponding to the cursor manipulation. Meanwhile, the program integration means artificially integrates the programs that are adjacent on the time axis and moves the cursor with the program movement means.

Since the program integration means artificially integrates the programs that are adjacent on the time axis, when the user manipulates the cursor, with artificially integrated adjacent programs, the highlighted display is given as one program, and a single cursor movement moves from a plurality of integrated programs to the next program.

In the illustrated embodiment, the configuration may include a tuner for individually receiving a plurality of television broadcasts, a recording means for recording and reproducing content of television broadcasts by program, a full-time recording control means for full-time reception of the content of a designated plurality of channels with the tuners, and recording the content with the recording means, and a program list production means for producing a program list in a table format in the order in which the recorded programs are recorded on each channel, wherein the program movement means and the program integration means make use of the program list produced by the program list production means.

With this configuration, when the program list is produced in table format and in the order in which the recorded programs are recorded on each channel, the program movement means and the program integration means use the program list produced by the program list production means.

With the present invention, programs that are adjacent on a time line can be artificially integrated and moved with a cursor by the program movement means, so the number of times the cursor has to be moved can be reduced.

For example, program information is checked in time order, programs are compared to the ones immediately before them, those that are of short duration are concluded to be connected programs, and when the display is changed to a past program list, that time is used for the immediately prior program, which reduces the number of programs on the program list. Doing this eliminates the display of minor selection options present between drama or sports programs, and affords a program list that looks cleaner overall and makes selection easier.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A display device comprising:
   a display portion;
   an input portion that receives an instruction to select a program in a program list, with the display portion displaying a frame indicative of the program in the program list with a distinguishable expression; and
   a controller that links a first program with a second program that is arranged relative to the first program along a time axis of the program list while the first program has a program time period shorter than a predetermined time period, that merges frames indicative of the first program and the second program in the program list into a single frame indicative of the second program upon linking the first program with the second program, and that controls the display portion to integrally display the single frame in the program list with the distinguishable expression and to move the distinguishable expression between the single frame and an adjacent frame with a single operation of a cursor key.

2. The display device according to claim 1, wherein the controller further links the first program with the second program that is arranged directly or indirectly adjacent to the first program along the time axis of the program list.

3. The display device according to claim 1, wherein the controller further links the first program with the second program that is arranged before the first program along the time axis of the program list.

4. The display device according to claim 1, wherein the controller further links the first program that has a specific genre with the second program.

5. The display device according to claim 1, wherein the predetermined time period is settable.

6. The display device according to claim 1, further comprising
   a memory that stores program viewing history according to program viewing instructions,
   the controller further linking the first program with the second program based on the program viewing history.

7. The display device according to claim 6, wherein the controller further links the first program that has a genre that is not included in a genre of the program viewing history with the second program.

8. The display device according to claim 6, wherein the controller further links the first program that has the program time period that is shorter than a program time period of the program viewing history with the second program.

9. The display device according to claim 1, wherein the display portion further switchably displays program lists before and after linking the first program with the second program.

10. The display device according to claim 1, wherein the display portion further shows program information of the first program and the second program while displaying the single frame with the distinguishable expression.

11. The display device according to claim 1, wherein the display portion further shows the first program and the second program in the program list while displaying the single frame with the distinguishable expression.

12. The display device according to claim 1, wherein the distinguishable expression includes a marker indicating that a program link has been performed.

13. The display device according to claim 12, wherein the marker includes a program boarder between the first program and the second program.

14. The display device according to claim 1, wherein the display portion further displays the single frame with a background color as the distinguishable expression.

15. The display device according to claim 1, wherein the display portion further displays the single frame with a bold text as the distinguishable expression than that of another program.

16. The display device according to claim 1, wherein the first program and the second program are arbitrarily selectable.

17. The display device according to claim 1, wherein the controller further links the first program with the second program while a number of programs in the program list after linking the first program with the second program is not less than a specific proportion relative to a number of programs in the program list before linking the first program with the second program.

18. The display device according to claim 17, wherein the specific proportion is 50%.

19. The display device according to claim 1, further comprising
- at least one tuner that receives television broadcast signals, respectively, and
- a record and reproduction portion that records and reproduces the television broadcast signals,
- the display portion further displaying program information of programs recorded by the record and reproduction portion in accordance with channels and recording orders of the programs in the program list.

20. The display device according to claim 1, wherein
- the controller further links the first program with the second program by providing the first program with linking information.

\* \* \* \* \*